United States Patent [19]
DeLuca et al.

[11] 3,741,996
[45] June 26, 1973

[54] 1α-HYDROXYCHOLECALCIFEROL

[75] Inventors: Hector F. DeLuca, Madison; Heinrich K. Schnoes, Waunakee; Michael F. Holick; Erich J. Semmler, both of Madison, all of Wis.

[73] Assignee: Wisconsin Alumni Research Foundation, Madison, Wis.

[22] Filed: Dec. 2, 1971

[21] Appl. No.: 204,305

[52] U.S. Cl. ................ 260/397.2, 260/239.55 C
[51] Int. Cl. ................ C07c 171/10, C07c 169/60
[58] Field of Search ................ 260/397.2

[56] References Cited

UNITED STATES PATENTS

| 3,565,924 | 2/1971 | DeLuca | 260/397.2 |
| 3,702,810 | 11/1972 | DeLuca et al. | 260/397.2 |

Primary Examiner—Elbert L. Roberts
Attorney—Howard W. Bremer

[57] ABSTRACT

1α-hydroxycholecalciferol and method for preparing the same. The compound is characterized by antirachitic and other vitamin D-like activity and finds application in situations where vitamin D is now being used.

2 Claims, No Drawings

1α-HYDROXYCHOLECALCIFEROL

The invention described herein was made in the course of work under a grant or award from the Department of Health, Education, and Welfare.

This invention relates to compounds having vitamin D-like activity.

More specifically this invention relates to a derivative of vitamin $D_3$.

The application of various of the D vitamins in situations where corrections in calcium metabolism is being sought are well documented. Specific among such applications, and perhaps the most widely known, is the antirachitic activity of vitamin $D_3$ (cholecalciferol). Other applications of the D vitamins as nutritional supplements are also well established.

A derivative of vitamin D has now been found which is characterized by greater biological activity than vitamin $D_3$. This derivative has been identified as 1α-hydroxycholecalciferol and is obtained in accordance with the following procedure.

SYNTHESIS

In the following description the Roman numeral designations of the compounds are identical with like designations in the schematic of the process set forth hereinafter.

Cholesterol (60 g.) in 240 ml. glacial acetic acid was treated dropwise with 4.5 ml. fuming nitric acid while stirring. The mixture was then cooled in ice-salt bath and additional fuming nitric acid (390 ml.) was added over a 1 hour period after which stirring was continued for another 0.5 hours. The reaction mixture was then rapidly suction filtered, the residue taken up in 570 ml. glacial acetic acid to which 107 ml. $H_2O$ and Zn dust (71 g.) were added, and heated for 1 hour on a steam bath. After refluxing for an additional 10 hour period the reaction mixture was diluted with $H_2O$ and extracted with diethyl ether. The ether layer was separated and evaporated to dryness. To the residue 400 ml. of 100 percent ethanol and 85 ml. concentrated HCl were added and the solution refluxed for 2 hours. Enough $H_2O$ was then added to induce slight turbidity, and the product allowed to crystallize. Recrystallization from aqueous ethanol yielded 25 g. of pure 3β-hydroxy-5α-cholestan-6-one (II).

15 gms. of 3β-hydroxy-5α-cholestan-6-one was added to 500 ml. of redistilled Skelly B (essentially normal hexane, derived from petroleum oil, marketed by Skelly Oil Company) which boiled within the range from 67°–69° C. To this mixture 50 ml. of freshly distilled ethylene glycol and p-toluenesulfonic acid monohydrate (110 mg) were added in a one liter round bottom flask fitted with a Dean-Stark trap. This was then refluxed for 22 hours with the trap being drained periodically. Mass spectral analysis of the reaction mixture at this time indicated that no starting material was present. The mixture was cooled and sodium acetate (0.3 g.) added. The hexane layer was decanted and diluted with a small amount of ethyl ether and extracted three times with 2 percent sodium acetate. The ethylene glycol layer was diluted with $H_2O$ and extracted with ether. This ether layer was washed twice with 2 percent sodium acetate and combined with the previously described ether-hexane layer. This was evaporated to dryness and a while mass obtained. Recrystallization from methyl acetate gave 12.6 g. of 6-ethylenedioxy-5α-cholestan-3β-ol (III).

6-ethylenedioxy-5α-cholestan-3β-ol was dissolved in pyridine and added to ice-cold pyridine-$CrO_3$ complex previously prepared by adding $CrO_3$ (182 g.) to ice-cold pyridine (182 ml.). An additional amount of pyridine (90 ml.) was utilized in aiding transfer. The mixture was allowed to come to room temperature and stirred for 10 hours. It was then brought to a volume of 500 ml. with ethyl acetate and filtered through a 4 cm. column packed with 50 gms. of Celite (a diatomaceous silica product marketed by Johns-Mansville Company) slurried in ethyl acetate. Elution was carried out with ethyl acetate until 750 ml. were collected. This was filtered through a 6 cm. column packed with neutral alumina (100 g.) slurried in ethyl acetate. One thousand two hundred ml. were collected eluting with ethyl acetate. The solution on evaporation gave a solid with a green tint. A 2 × 23.5 cm. (50 g. neutral alumina, minus 200 mesh) column was prepared. The above sample in 40 ml. of ethyl acetate was applied and elution was then carried out with ethyl acetate. The product eluted in the first 150 ml. giving 12.3 g. of pure 6-ethylenedioxy-cholestan-3-one (IV).

6-ethylenedioxy-cholestan-3-one (10.0 g.) was dissolved in tetrahydrofuran (190 ml.) and acetamide (2.67 g.) added. The solution was heated to 50°C. and 3 drops of acetic acid and 1 drop of HBr added. The bromine (3.61 g.) in $CCl_4$ (7.0 ml.) was added at the rate it decolorized. The solution, which was slightly yellow and contained the HBr-acetamide complex, was rapidly cooled in ice and filtered by suction through a sintered glass filter. Fifty ml. ethyl acetate was used to assure quantitative filtration. This solution was then filtered through a 4 cm. (50 g.) column of alumina slurried in ethyl acetate. This was followed by 75 ml. of ethyl acetate. The solution was evaporated to dryness. A slightly yellow solid was obtained which was identified as 2α-bromo-6-ethylenedioxy-cholestan-3-one (IVa).

2α-bromo-6-ethylenedioxy-cholestan-3-one was added to collidine (40 ml.) and nitrogen passed over it for 1 hour. It was then refluxed for 1.5 hours and cooled while still under a nitrogen atmosphere. Two ml. of the reaction product was diluted with ether and extracted three times with $H_2O$. The ether layers were evaporated to dryness and the resulting material was placed on a 3 cm. diameter Sephadex LH-20 column (100 g.), (Sephadex LH-20 is a hydroxypropyl ether derivative of a polydextran marketed by Pharmacia Fine Chemicals Inc., Piscataway, N.J.) slurried in methanol and 10 ml. fractions collected. Fractions were assayed by thin-layer chromatography using silica gel G (a commercial silica gel preparation marketed by EM Laboratories, Inc., Elmsford, N.Y.) and 3 to 1 cyclohexane-ethyl acetate. Fractions 25–33 were pooled and evaporated to dryness. Nuclear Magnetic Resonance spectra on this material indicated that the α-bromo compound was still present. The remaining material was refluxed an additional one-half hour as described above. This material, after cooling, was extracted three times with $H_2O$ after diluting with ether. It was then placed under vacuum until a thick black gum resulted. This was taken up in methanol and a small amount of ether was added to increase solubility. When cooled, a white precipitate resulted (2.4 g.). When this was repeated another 1.6 g. was collected. Both precipitations yielded a mixture of saturated and $\Delta^1$ sterol. The filtrate from the second precipitation was evaporated to dryness and then taken up in 10 ml. of 1 to 1 CHCl$_3$-distilled Skelly solve B. This was applied to a 4 cm. diameter Sephadex LH-20 column (300 g.) slurried in the same solvent. Ten ml. fractions were then collected. The fractions were assayed by thin layer chromatography on silica gel using 85 to 15 cyclohexane-ethyl acetate. Fractions 29-37 were pooled and evaporated to dryness. These pooled fractions were then reapplied to the same column as above. Ten ml. fractions were collected and assayed as above. Fractions 25-36 were pooled to yield 5.23 g. of a product identified as 6-ethylenedioxy-1-cholestan-3-one (V).

The precipitated sterol (4.0 g.) and the sterol obtained by chromatography (5.23 g.) were combined and dissolved in p-dioxane (200 ml.) and 1 N NaOH (50 ml.) was added. Then 30% H$_2$O$_2$ (17 ml.) was added with stirring over a 1 hour period. Stirring was continued for 20 hours after which time the reaction mixture was diluted with H$_2$O and shaken with ether. The ether layer was separated and washed with H$_2$O. The combined H$_2$O phases were extracted twice more with ether and the two ether phases washed with water. All ether phases were then combined and evaporated to dryness. NMR analysis indicated some dioxane contaminant and the material was again taken up in ether and extracted with H$_2$O. The ether was evaporated to yield 8.8 g. of crude 6-ethylenedioxy-1$\alpha$,2$\alpha$-oxicholestan-3-one (VI).

To the crude epoxide (VI, 8.8 g.) ether (140 ml.), and powdered LiAlH$_4$ (4.0 g.) was added over 30 min. The mixture was heated to reflux and after 1 hour more LiAlH$_4$ (0.5 g.) was added. After 6 hours total refluxing ethyl acetate was added to neutralize excess LiAlH$_4$. This was diluted further with ether and extracted with saturated potassium sodium tartrate. The aqueous phase was again extracted with ether and then with dichloromethane. The material was evaporated to dryness and applied to a 4 cm. Sephadex LH-20 column (300 g.) slurried in 1 to 1 CHCl$_3$-Skelly solve B. Ten ml. fractions were collected. Fractions 53-79 were pooled to yield 2.1 g. of mixed diols which were identified as 6,6'-ethylenedioxy-cholestan-1$\alpha$,3($\alpha,\beta$)-diol (VII).

2.1 g. 5$\alpha$-cholestan-6,6'-ethylenedioxy 1$\alpha$,3($\alpha,\beta$)-diol (VII) was dissolved in 20 ml. methanol and added to 20 ml. 95 percent ethanol containing 100 mg. of p-toluenesulfonic acid. This was reacted at 25°C. for 12 hours. The reaction was extracted with aqueous NaHCO$_3$ and ether. The aqueous phase was extracted twice with ether. The ether phases were combined and taken to dryness by flash evaporation. The product, 5$\alpha$-cholestan-6-one-1$\alpha$,3($\alpha$, $\beta$)diol (VIIIa), was acetylated by dissolving in 50 ml. acetic anhydride and 5 ml. pyridine. The acetylation was done at 40°C. for 48 hours. The reaction was extracted with diethylether and H$_2$O (pH -4 with H$_2$SO$_4$). The ether phase was collected and the aqueous phase was extracted twice with diethylether. The ether phases were combined and dried under nitrogen gas. The product, 5$\alpha$-cholestan-1$\alpha$,3($\alpha,\beta$) diacetoxy-6-one (VIIIb), was crystallized from methanol. The first batch of crystals contained the 3$\alpha$-isomer as well as some 3$\beta$-isomer. 1.6 g. was recovered.

A second crop of crystals was recovered from the MeOH. This crop contained greater than 98 percent of the 3$\beta$-isomer (0.6 g. was recovered).

0.6 g. of 5$\alpha$-cholestan-1$\alpha$,3$\beta$diacetoxy-6-one was dissolved in 40 ml. isopropanol. 10 ml. of isopropanol containing 100 mg. NaBH$_4$ was added and the reaction was stirred at 25°C. for 12 hours. The reaction was halted by adding water pH -4. The aqueous phase was extracted three times with diethylether. Approximately 0.6 g. of 5$\alpha$-cholestan-1$\alpha$,3$\beta$-diacetoxy-6-ol (IX) was recovered (98 percent yield).

Forty-five mg. of compound IX was dissolved in 10 ml. pyridine and brought to 4° C. in an ice bath. 0.2 ml. of POCl$_3$ was added dropwise to the vigorously stirring reaction over a period of 2 min. At the end of 2 min. the reaction was placed at 25° C. for another 4 hours. The reaction was extracted with diethyl ether-water (pH-4). The ether phase was collected and the aqueous phase was extracted twice more with diethyl ether. The ether phases were combined and dried under nitrogen gas to yield 40 mg. of 1$\alpha$,3$\beta$-diacetoxycholesterol (X) (90 percent yield).

Twenty mg. of compound X was dissolved in 1.5 ml. of 1:1 Skelly solve B (predominantly n-hexane, b.p. 67°-69° C.)-benzene and placed in a 72° C. water bath. 0.5 M (11.7 mg.) of N,N'-dimethyldibromohydantoin was added and the reaction was continued for 10 min. After 10 min. the reaction was placed on ice for 2 min. and then filtered. The filtrate was collected and the precipitate was washed twice with 0.2 ml. cold Skelly solve B. The filtrate and washings were combined and dried under nitrogen gas. 20 mg. of the product, 1$\alpha$,3$\beta$-diacetoxy-7-bromocholesterol (X (a)) was dissolved in 0.4 ml. xylene and added to a solution containing 0.1 ml. trimethylphosphite and 0.3 ml. xylene at 135° C. over a period of 2 min. The reaction continued at 135° C. for 90 min. and then dried under nitrogen gas. The product, containing 1$\alpha$,3$\beta$-diacetoxy-cholestan-4,7-diene as an impurity, was dissolved in 0.3 ml. 3:1 Skelly solve B-diethyl ether and applied to a 2 × 20 cm. glass column containing 10 g. neutral alumina in the same solvent. The column was eluted batchwise with 110 ml. 3:1 Skelly solve B-Et$_2$O and then with 400 ml. 1:1 Skelly solve B-Et$_2$O. 600 $\mu$g. of the 5,7-diene (XI) was recovered.

The irradiation of XI was done according to the procedure of Blunt and DeLuca (Biochemistry 8: 671, 1969) wherein the compound was dissolved in 400 ml. of ether and was then exposed to the radiation from a Hanovia high pressure quartz mercury vapor lamp (Model 654A) for 1 min. The irradiation was carried out in a jacket around a double-walled, water-cooled, quartz immersion well and during irradiation the ether solution was stirred vigorously and continuously flushed with nitrogen. The product was applied in 0.1 ml. of a 1:4 solution of Skelly solve B-Et$_2$O to a 1 × 10 cm. column containing 1 g. Celite (a diatomaceous silica product marketed by Johns Mansville Company) and 5 g. AgNO$_3$ impregnated silicic acid. The column was eluted batchwise with 60 ml. 1:4 Skelly solve B-Et$_2$O and then with 100 ml. 1:1 Skelly solve B-Et$_2$O. Ten ml. fractions were collected. Tube No. 7 contained about 120 $\mu$g. of 1$\alpha$,3$\beta$-diacetoxy-previtamin D$_3$ (XII).

This tube was dried under N$_2$ and the sample was redissolved in 2 ml. toluene, flushed with nitrogen and permitted to stay at room temperature for 14 days in the dark. After 14 days the previtamin D$_3$ had been quantitatively converted to 1$\alpha$,3$\beta$-diacetoxyvitamin D$_3$ (XIII).

30 μg. of this compound (XIII) was saponified in 0.55 ml. of 1000:1 ethanol-saturate aqueous KOH and refluxed for 30 min. The reaction was extracted with water: CHCl₃. The CHCl₃ phase was collected and dried under nitrogen. The saponification was quantitative.

The sample was dissolved in 1:1 Skelly solve B:CHCl₃ 0.1 ml. and applied to a 20 g. Sephadex LH-20 column slurried in the same solvent according to the procedure of Holick and DeLuca (J. Lipid Res. 12: 460, 1971) yielding 1α-hydroxycholecalciferol (XIV).

It is to be understood that in the aforedescribed procedure various changes can be made in the amounts and kinds of solvents which can be utilized and that variations in reaction temperatures and amounts of reactants can be made without departing from the scope and spirit of the invention. Also, certain of the reactions can be carried out in different sequence. For example, compound VII can be converted to the 1,3-diacetate followed by removal of the ketal function to give compound VIII(b).

In addition, other methods may be used to separate the various desired components where such alternate methods are obvious to those skilled in the art.

PROCESS SCHEMATIC

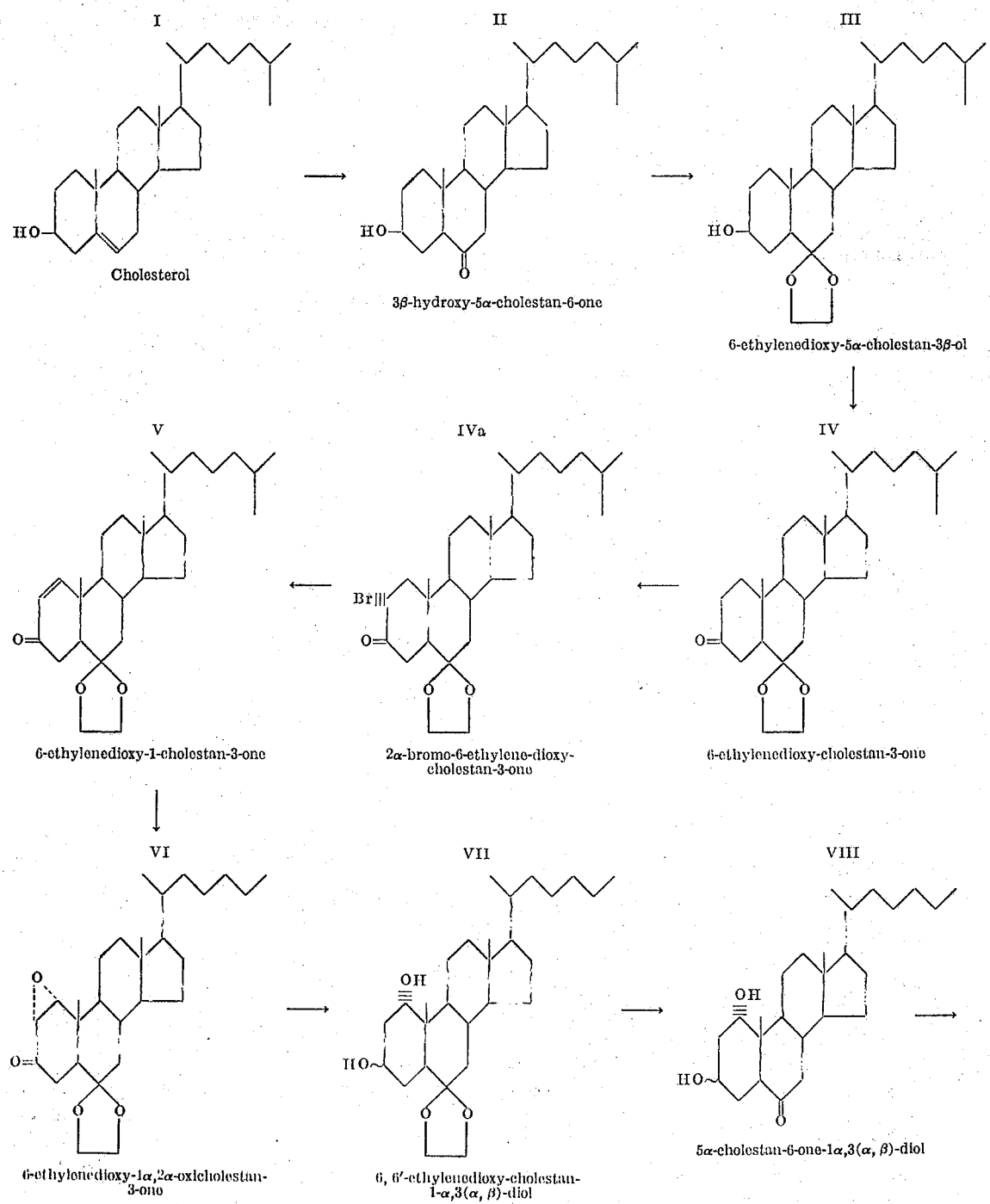

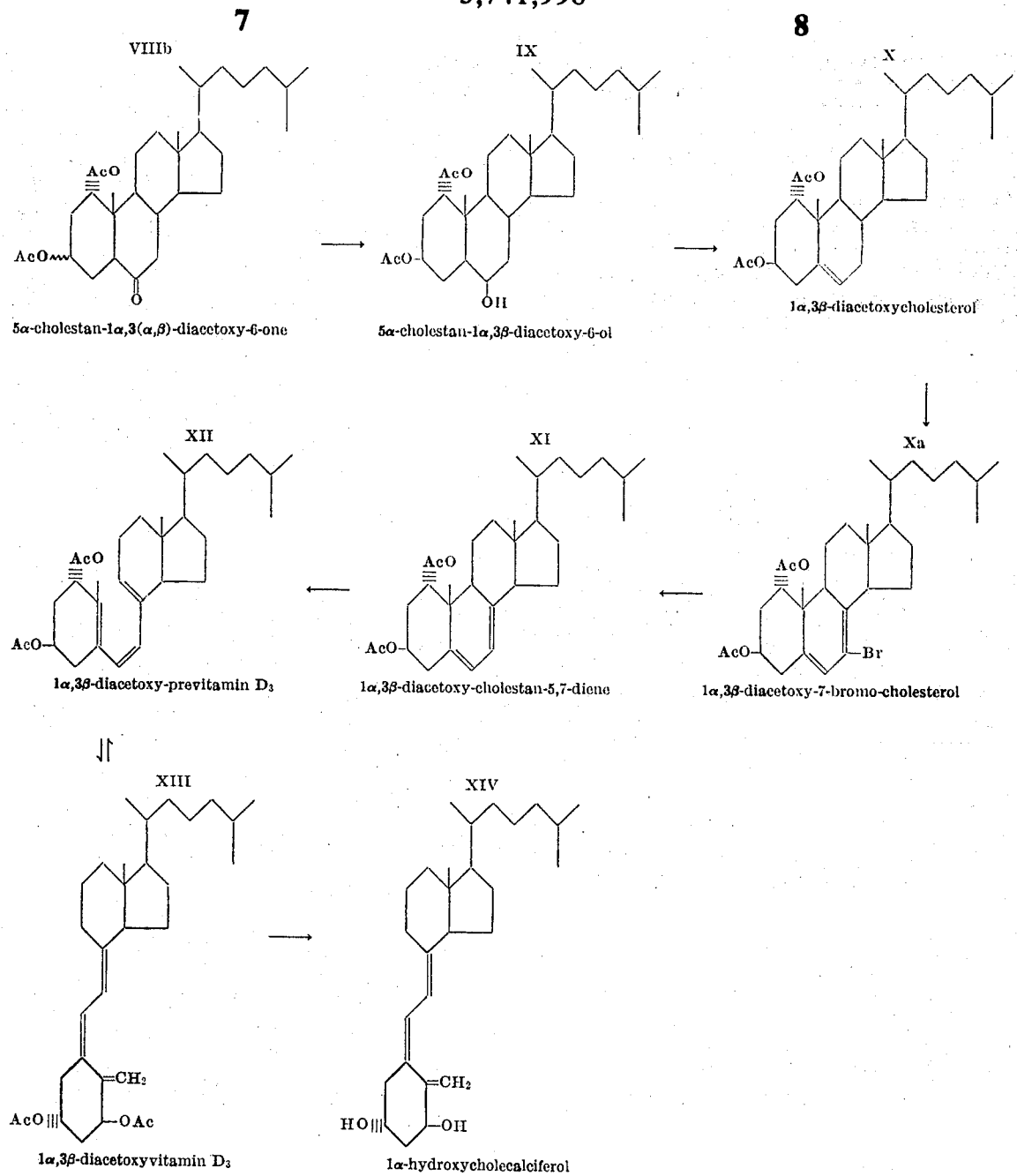

BIOLOGICAL ACTIVITY

Line test assay or rickets cure test

Weanling rats were fed the rachitogenic diet of Steenbock and Black, J. Biol. Chem. 64, 263 (1925) for 21 days. The diet was modified slightly by the addition of one-half percent brewer's yeast. After the 21 day depletion period a single dose of 0.075 µg. of vitamin $D_3$ or 1α-hydroxycholecalciferol dissolved in vegetable oil was administered orally. Seven days later the rats were killed and the line test was performed on sectioned radii and ulnae of individual rats. The biological activity was ascertained as described in U.S. Pharmacopeia, 14th revison (Mack Publishing Co., Easton, Pa. (1955)).

The average healing value obtained with vitamin $D_3$ was 4.00 and with 1α-hydroxycholecalciferol was 4.28. These results indicate that the 1α-hydroxycholecalciferol is at least as effective as vitamin $D_3$ in curing rickets.

Serum calcium (bone mobilization) response and intestinal calcium transport

Bone mineral mobilization response to 1α-hydroxycholecalciferol administered to rats intravenously (intrajugular) in ethyl alcohol was tested as described in Blunt et al., Nat'l. Acad. Sci. U.S. 61, 1503 (1968). In addition, intestines were removed from these rats and calcium transport was measured by the everted sac technique as described in the above reference. The results are shown in Table I below and indicate that 1α-hydroxycholecalciferol had a significant effect in the stimulation of calcium transport in the intestine and in bone mobilization as indicated by a rise in serum (plasma) calcium at the expense of bone. All measurements were taken 14 hours after administration of the materials being tested.

TABLE I

| Group | Calcium Transport Ratio $^{45}$Ca Serosal/$_{45}$ Ca Mucosal | Bone Mobilization Serum Ca. (mg. %) |
|---|---|---|
| Control 50 μl. 95% EtOH | 1.96 ±0.14* | −0.06 ±0.2* |
| 0.25 μg. 1α-hydroxycholecalciferol | 3.28±0.36* | 2.17±0.2* |
| 0.50 μg. 1α-hydroxycholecalciferol | 3.31±0.26* | 2.37±0.2* |

*± standard error of the mean

It is evident from the foregoing data that 1α-hydroxycholecalciferol exhibits an antirachitic effect at least as good as vitamin $D_3$ and that it also carries out the well known effect of vitamin D on bone. This vitamin D like activity, as amply demonstrated, suggests its application as a substitute for vitamin D as, for example, a poultry or animal feed supplement or as a food additive.

Having thus described the invention, what is claimed is:

1. 1α-hydroxycholecalciferol.
2. A method of preparing 1α-hydroxycholecalciferol which comprises:
   converting cholesterol into its 6-keto derivative
   forming a ketal from the said 6-keto derivative
   oxidizing the said ketal and converting the oxidized product through the 2-bromo derivative into the $\Delta^1$ compound 6-ethylenedioxy-1-cholestan-3-one
   epoxidizing the said $\Delta^1$ compound under basic conditions, reducing the epoxidized compound with lithium aluminum hydride and recovering as a mixture, 6-ethylenedioxy-cholestan-1α3(α,β)- diol
   removing the ketal function from the said diols to give the corresponding 6-keto compounds
   acetylating both hydroxyls in the said 6-keto compounds and separating the 3α and the 3β isomer
   treating the 3β isomer with sodium borohydride to reduce the keto function and recovering 5α-cholestan-1α,3β-diacetoxy-6-ol
   eliminating the hydroxyl group from the said alcohol via treatment with phosphorous oxychloride
   subjecting the resulting compound to allylic bromination followed by treatment with trimethyl phosphite and recovering 1α,3β-diacetoxy-cholestan-5,7-diene
   irradiating the said 5,7-diene with ultraviolet light and recovering 1α,3β-diacetoxy-previtamin $D_3$
   allowing the said previtamin to spontaneously convert to 1α,3β-diacetoxy vitamin $D_3$ by standing in solution at room temperature and in the dark for a time sufficient to accomplish the said conversion and recovering the said vitamin $D_3$ compound
   hydrolyzing the said vitamin $D_3$ compound under basic conditions and recovering 1α-hydroxycholecalciferol

* * * * *